3,292,018
TRANSDUCERS
Manfred E. Clynes, Palisades, N.Y., assignor to Air-Shields, Inc., Hatboro, Pa., a corporation of Delaware
Filed Sept. 13, 1963, Ser. No. 308,847
5 Claims. (Cl. 310—8.1)

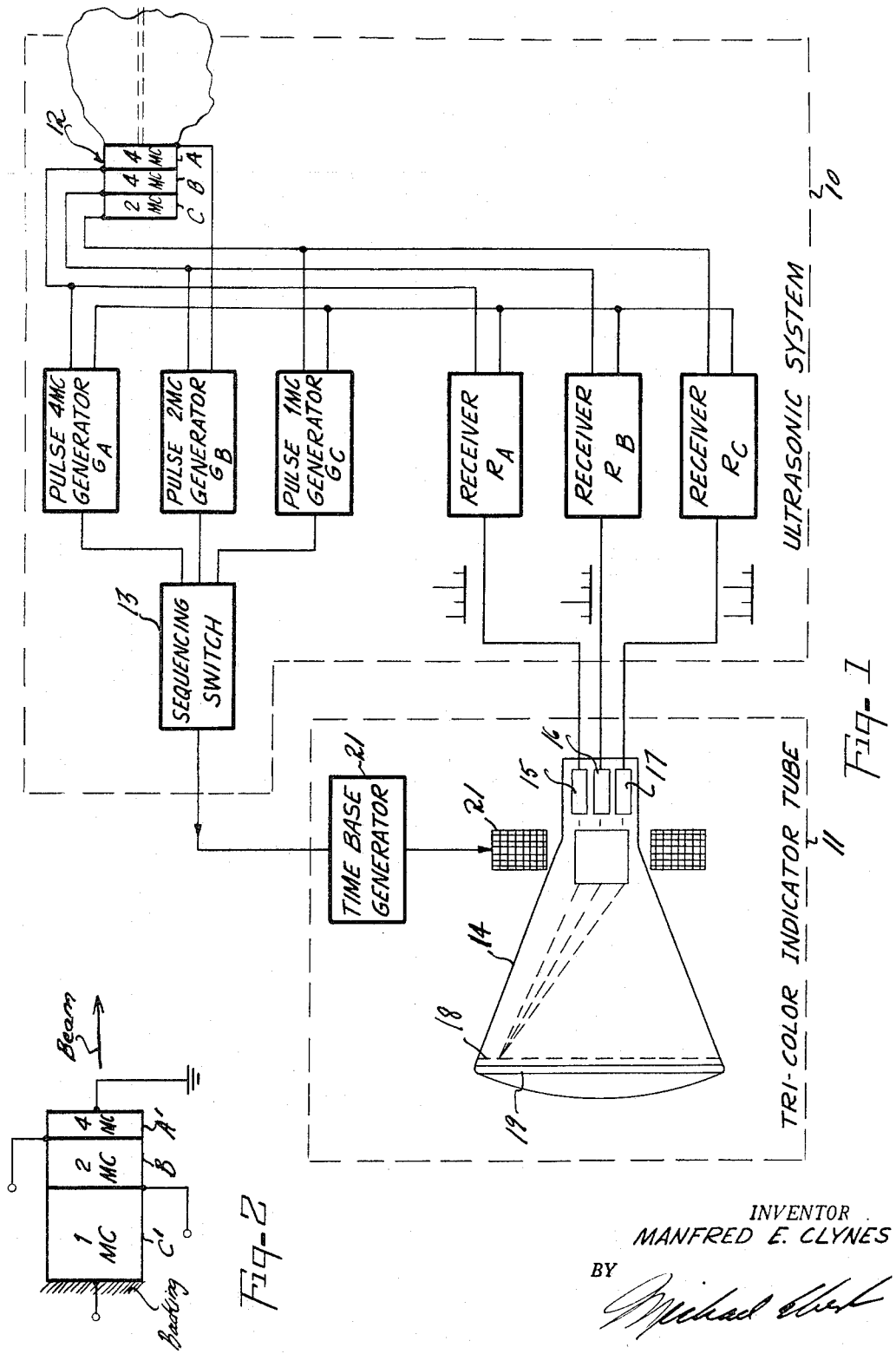

This invention relates generally to ultrasonic techniques for exploring the internal structure of living organisms and the visualization thereof in terms of color, and more particularly to ultrasonic transducers for this purpose.

It is known to use pulse-echo ultrasonic methods in combination with standard scanning procedures to produce patterns on a cathode ray viewing screen representative of the internal structure being scanned. Such representations, with existing techniques, are essentially black and white or monochrome images. Thus, structural characteristics are displayed in the gray scale and must be analyzed accordingly. This seriously limits the diagnostic value of the ultrasonic technique.

If, for example, an ultrasonic examination is to be made of a tumor, differentiation can be made between tumors which grow in a diffused manner and those enclosed in a smooth sheath. With existing scanning techniques, this difference would at best be revealed as a slight difference in the gray scale, and the diagnosis would be uncertain.

In my copending application, Serial No. 211,730, now Patent No. 3,156,110, there is disclosed an ultrasonic technique for the detection and visualization of internal structure, whereby color patterns or images are produced, indicative of the irradiated medium. The shades or variations of color which are presented are related to differences in structural characteristics, thereby facilitating diagnosis. Thus tumors growing in a diffused manner will be revealed in colors distinct from those enclosed in a smooth sheath, and various differences in growth structure can be more easily recognized. Thus cancerous tumors might be detected in colors distinct from those produced by benign tumors.

In the system disclosed in my copending application, the body is scanned or explored by three ultrasonic beams, each having a different frequency, to produce three signals which are modulated as a function of the characteristics of the medium with reference to the beam frequency. The signals are applied as intensity modulation components to a color television tube to effect a visual presentation in color. Since various structures of the body, and in particular variations in the soft tissues, have different absorption and reflection properties with reference to different ultrasonic frequencies, a differential visualization can be obtained wherein shades of color rather than shades of gray, are correlated to differences in structural characteristics. Thus the diagnostic instrument is constituted by a tri-frequency ultrasonic scanning system coordinated with a tri-color television indicator to produce images of internal structure, the instrument being useable without the slightest danger to the patient.

One of the important advantages of the invention disclosed in said copending application is that it allows an arbitrary choice to be made of the three ultrasonic frequencies. This choice makes it possible to obtain different color effects from the same internal structure and thus in effect constitutes an electronic staining technique.

It is necessary in a system of the above-described type to have an ultrasonic transducer which will project the various frequencies into the same region of the body and receive reflections or echoes therefrom. The use of separate transducers for each frequency creates difficulties in this regard. On the other hand, while concentric rings may be used, inasmuch as the transducers are small, in the order of one centimeter in diameter, it is extremely difficult to fabricate such a concentric arrangement. Moreover, the beams produced thereby have unpredictable boundaries.

Accordingly, it is the main object of this invention to provide a stacked transducer for projecting ultrasonic beams of different frequency in a common path.

More specifically, it is an object of the invention to provide a stacked transducer in an ultrasonic system wherein the transducer sections are sequentially or simultaneously excited to produce three beams of different frequency in a common path and three echo signals which are modulated as a function of the characteristics of the medium with respect to the beam frequency, these signals being applied as intensity-modulation components to a color television tube to effect a visual presentation in color.

For a better understanding of the invention, as well as other objects and further features thereof, reference is made to the following detailed description to be read in conjunction with the accompanying drawing, wherein:

FIG. 1 is a schematic diagram of a simplified diagnostic system which incorporates a stacked transducer in accordance with the invention; and FIG. 2 is a modified form of stacked transducer.

The production of color images can be effected either through transmittance and absorption of ultrasonic energy or by transmittance and reflection, the latter technique being known also as the pulse echo technique. While the invention will be described herein in connection with the pulse echo technique, it will be understood that the principles thereof are also applicable to transmittance and absorption examination methods.

Referring now to FIG. 1, the basic assembly in accordance with the invention comprises a tri-frequency ultrasonic pulse echo system, generally designated by the numeral 10, and a color indicator 11. The pulse echo system includes a stacked transducer 12 constituted by three ultrasonic elements A, B and C, which may take the form of barium titanate. This material behaves as an electrostrictive piezoelectric transducer adapted to convert radio-frequency energy into ultrasonic waves, or to convert ultrasonic waves into radio-frequency energy. Thus the transducer elements are capable of acting as ultrasonic transmitting or detecting elements.

The stacked transducer 12 is made by sandwiching resonant transducer blanks of a half-wave thickness, each of which is conductively plated on both faces to provide electrodes. The three blanks are bonded together and wires are attached to the junctions therebetween and to the end electrodes. By way of example, element A is a four-megacycle crystal and is at the front of the stacked transducer, the intermediate crystal B is also a four-megacycle crystal, while the rear crystal C has a resonant frequency of two megacycles.

Since the pulse echo technique is being used, the stacked transducer 12 is sequentially excited by means of three pulse generators $G_A$, $G_B$ and $G_C$ operating at respective carrier frequencies of 4, 2 and 1 megacycles to produce three exploratory beams in a common path. The front electrode of the crystal A is connected to the "hot" terminal of generators $G_A$, $G_B$ and $G_C$. The other terminal of generator $G_A$ is connected to the junction of elements A and B, the other terminal of generator $G_B$ is connected to the junction of elements B and C, and the other terminal of generator $G_C$ to the rear electrode of element C. Echo pulses detected by the transducers are applied directly to receivers $R_A$, $R_B$, $R_C$, respectively, each of which is tuned to a respective beam frequency to produce output voltage pulses whose magnitudes are proportional to the amplitude of the echo pulses.

The pulse generators are sequentially actuated by a sequential switch 13 such that when 4-mc. generator $G_A$ produces a pulse, it excites the 4-mc. element A, when 2-mc. generator $G_B$ is pulsed it excites the 4-mc. elements A and B in series, and when 1-mc. generator $C_C$ is pulsed it excites the 4-mc. elements A and B in series with the 2-mc. element C. The pulse generators operate at a repetition rate of, say, about 1500 pulses per second, each pulse being of microsecond duration. Since the generators are normally inoperative and are actuated in sequence, each generator produces 500 pulses per second. In practice, the duration of each pulse may be in the order of 10 microseconds or even shorter, and should be made up of as few cycles of the resonant frequency as possible. Pulse echo reception takes place in the interval between pulses. The amplified echoes are synchronously commutated to the three beams.

The three successive beams are focused to irradiate the same region of internal structure, and the presence of reflecting bodies within the region in the path of the beam results in echo pulses which will be picked up by the active transducer elements, the echo pulses returning at different points in time depending on their relative distance from the transducer stack. Thus the time of arrival of the echo pulse gives an indication of the spatial position of the echo-producing target.

The amplitude of the echo pulses will depend on the characteristic of the reflecting structure with respect to the pulse frequency. For example, a bone will ordinarily produce a high degree of reflectivity, but its reflection pulse will nevertheless be different for each pulse frequency. Similar differences will occur for other internal elements of the human body, depending in a sense on their acoustic properties, very much as objects in an auditorium have different absorption or reflection quantities with respect to sound tones.

Using again the example of differentiating tumors, when a tumor is irradiated by the three beams, the output of receivers $R_A$, $R_B$ and $R_C$ will be constituted by voltage pulses whose relative magnitudes will be different for different types of tumor and thus serve as a method of discriminating between benign and malignant characteristics, especially since malignant tumors frequently are not encapsulated in a smooth capsule, as in the case of benign tumors.

The outputs of the thre receivers are applied to the intensity-modulation electrodes of a three-gun color TV tube or tricolor kinescope, such as a shadow mask color picture tube 14 now generally used in color TV receivers. These tubes produce color images through proper mixtures of the red, green and blue primary colors.

Three electron guns 15, 16 and 17 are employed, one for each primary color. The electron streams from the guns converge at a perforated masking plate 18, and after passing through a perforation, the beams diverge and impinge upon three separate phosphor dots which when so excited, produce the red, blue and green lights corresponding to the individual exciting beams. One set of tricolor dots is located in a triangular configuration behind each perforation on a screen 19, there being over 350,000 such perforations in the masking plate.

The three electron beams are individually focused and by an electrostatic lens system are made to converge at the apertured mask. The beams are electromagnetically deflected in the horizontal and vertical planes by a common yoke 20. While electromagnetic deflection has been disclosed, it is to be understood that electrostatic means may be used for the same purpose.

The shadow mask holes and the screen dots are so positioned that the electron beam from the green gun can strike only green-emitting dots, and the red and blue beams can strike only red and blue emitting dots. The intensity of the light from the individual dots is controlled by the beam intensities, which are in turn controlled by the individual gun grids. The eye automatically integrates the colors and their intensities so that the color seen will be the additive resultant of the three primaries.

When, therefore, the intensity grids of the three cathode-ray guns are connected to the outputs of receivers $R_A$, $R_B$ and $R_C$, the resultant image color will depend on the relative magnitudes of the applied signals, which in turn depend on the characteristic of the structure being irradiated.

To illustrate the operation of the system in the simplest possible manner, we shall assume that the three transducers produce beams which are directed to the cardiac region of a patient and so trained that lying in the beam path is the mitral valve guarding the opening between the left auricle and the left ventricle and preventing the return of blood to the auricle. Thus this valve element is in movement, and we shall assume in this example that all other reflecting targets in the path of the beam are static. Of course, in practice the other targets, such as the wall of the heart, may also be in motion.

To display the various echo pulses in the path of the three beams along a common base line, we make use of a time base saw-tooth wave generator 21 coupled to the deflection yoke 20 to deflect the three-color beam along a horizontal line. The time base generator is synchronized with the sequential switch for the pulse generators $G_A$, $G_B$ and $G_C$ so that scanning commences simultaneously with the transmission of each of the three ultrasonic pulses.

As the convergent electron beams are horizontally deflected, their intensities are modulated by the output of receivers $R_A$, $R_B$ and $R_C$. Along the base line on the screen a series of illuminated dots is developed, each representing a particular echo. Each dot has a distinctive color depending on the nature of the reflecting object producing the echo. The space between dots represents the relative displacement between the reflecting objects in the irradiated path.

In the transducer stack shown in FIG. 1, the elements are so excited that first the front element A generates an ultrasonic pulse, then the first and second elements A and B together generate ultrasonic pulses, and finally all three elements A, B and C taken together generate an ultrasonic pulse. The combined thicknesses of the excited elements determine the operating frequency.

In the transducer stack shown in FIG. 2, elements A', B' and C' have thicknesses of 4 mc., 2 mc., and 1 mc., respectively. In this instance, they are excited sequentially one element at a time, so that first element A' generates an ultrasonic pulse of 4 mc., then element B' generates an ultrasonic pulse of 2 mc. which is projected through inactive element A', and finally element C' generates a 1-mc. pulse which is projected through inactive elements A' and B'. While some close-up reflections are produced by this arrangement, three beams of different frequency are generated in accordance with the requirements of the invention.

The direction of the beam is forwardly from element A' and in practice a damping medium such as epoxy mixed with fine metal particles may be placed behind element C'. It is also possible to excite the three elements simultaneously.

While there have been shown preferred embodiments of transducers in accordance with the invention, it will be appreciated that many changes and modifications may be made therein without, however, departing from the essential spirit of the invention as defined in the annexed claims.

What is claimed is:

1. In an ultrasonic system, a transducer constituted by three resonant transducer blanks each of a half-wave thickness, each being conductively plated on both faces, the three blanks being interfacially bonded to form a composite structure, terminals connected to the end faces of said composite structure and the bonded faces thereof, and means connected to said terminals selectively to excite said blanks to generate three different ultrasonic frequencies in sequence.

2. A system as set forth in claim 1, wherein said means excites one blank at a time.

3. A system as set forth in claim 1, wherein said means first excites one end blank, then excites said end blank and the intermediate blank and finally excites all three blanks.

4. In an ultrasonic system, a transducer constituted by three resonant transducer blanks of different thickness to generate beams of different frequency, each being conductively plated on both faces, the three blanks being interfacially bonded to form a composite structure, terminals connected to the end faces of said composite structure and the bonded faces thereof, and means connected to said terminals sequentially to excite said three blanks to generate three different ultrasonic frequencies in sequence.

5. In an ultrasonic system, a transducer constituted by three resonant transducer blanks each of a half-wave thickness, each being conductively plated on both faces, the three blanks being interfacially bonded to form a composite structure, terminals connected to the end faces of said composite structure and the bonded faces thereof, and means connected to said terminals selectively to excite said blanks so that first one end blank only is excited, then said end blank in combination with the intermediate blank is excited and finally all three blanks are simultaneously excited to generate three different ultrasonic frequencies in sequence.

References Cited by the Examiner
UNITED STATES PATENTS

| | | | |
|---|---|---|---|
| 2,479,926 | 8/1949 | Gravely | 310—9.8 |
| 2,851,877 | 9/1958 | Joy | 310—8.1 |
| 3,156,110 | 11/1964 | Clynes | 73—67.8 |

MILTON O. HIRSHFIELD, *Primary Examiner.*

MAX L. LEVY, *Examiner.*

A. J. ROSSI, *Assistant Examiner.*